United States Patent [19]
Stampfl et al.

[11] Patent Number: 5,669,260
[45] Date of Patent: Sep. 23, 1997

[54] METHOD OF MANUFACTURING A C-SHAPED RAIL WITH PROFILED SURFACES

[75] Inventors: Hans Stampfl, Feldkirch-Tisis; Siegfried Höfle, Götzis; Walter Hintersteiner, Ybbsitz, all of Austria

[73] Assignee: Hilti Aktiengesellschaft, Schaan, Liechtenstein

[21] Appl. No.: 626,818

[22] Filed: Apr. 3, 1996

[30]     Foreign Application Priority Data

Apr. 3, 1995 [DE] Germany .................. 195 12 414.6

[51] Int. Cl.⁶ .............................................. B21D 19/04
[52] U.S. Cl. ................................. 72/177; 72/178; 72/703
[58] Field of Search ................................. 72/177, 178, 182, 72/176, 366.2, 703

[56]              References Cited

U.S. PATENT DOCUMENTS

| | | | |
|---|---|---|---|
| 1,295,769 | 2/1919 | Kux | 72/178 |
| 1,343,753 | 6/1920 | Sloper | 72/177 |
| 4,357,818 | 11/1982 | Lyon | 72/177 |
| 4,498,323 | 2/1985 | Metzdorf | 72/177 |

FOREIGN PATENT DOCUMENTS

| | | |
|---|---|---|
| 0028507 | 5/1981 | European Pat. Off. . |
| 0507296 | 10/1992 | European Pat. Off. . |
| 112904 | 7/1982 | Japan ............ 72/177 |
| 92401 | 4/1990 | Japan ............ 72/177 |
| 2147838 | 5/1985 | United Kingdom . |

*Primary Examiner*—Daniel C. Crane
*Attorney, Agent, or Firm*—Anderson Kill & Olick, P.C.

[57]                ABSTRACT

A method of manufacturing an elongated rail (12) with a C-shaped cross-section transversely of its elongated direction from a sheet metal strip (1) by bending marginal sections along each elongated side edge (2) of the strip at 90° with respect to the surface of the strip. Effecting the bending action by discs (5, 6, 7). Next using a profiling disc (8) rolling a profiled surface into each of the side edges (2) and then after returning the marginal edges to their original thickness, bending the strip into a C-shaped cross section extending transversely of its elongated direction.

6 Claims, 1 Drawing Sheet

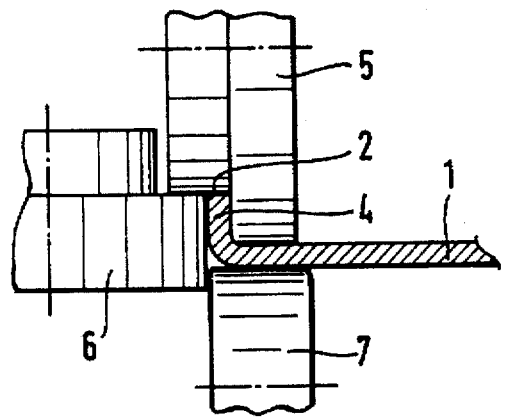
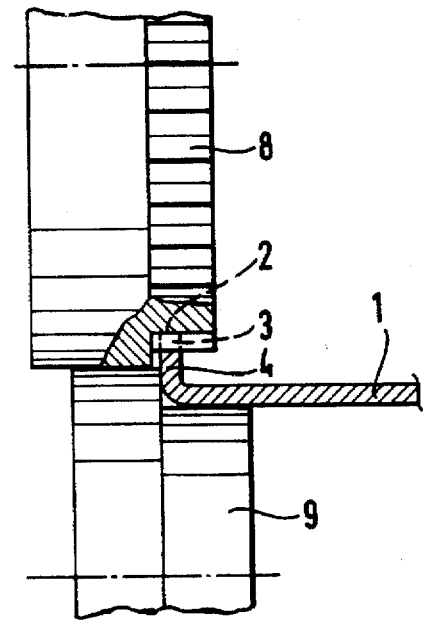
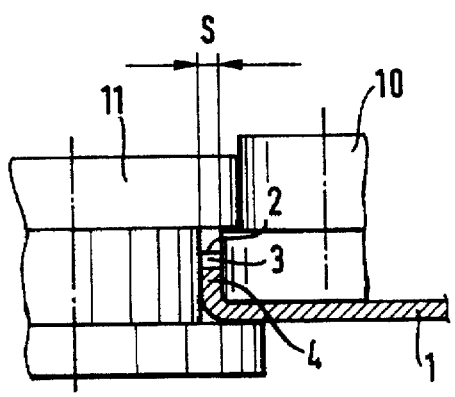
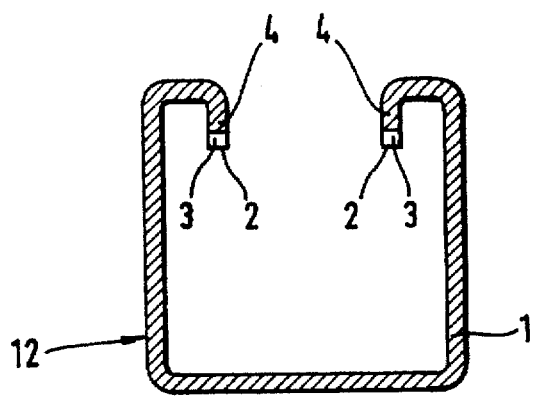

METHOD OF MANUFACTURING A C-SHAPED RAIL WITH PROFILED SURFACES

BACKGROUND OF THE INVENTION

The present invention is directed to a method of manufacturing a C-shaped rail with profiled surfaces where the profiled surfaces are located along inwardly directed elongated edges.

C-shaped rails with profiled surfaces serve for attaching objects, in particular pipes, to structural members where the rails are, as a rule, secured solidly to the structural component and the objects are fastened by means of rail nuts to the C-shaped rail. The rail nuts project into the profiled rails and have profiled surfaces which face the profiled surfaces along the elongated edges which extend inwardly into the C-shaped rail, so that, when the rail nuts are tightened, a positively locked connection is established between the profiled rails and the rail nuts preventing slippage of the rail nuts.

A method of fabricating C-shaped rails is disclosed in EU-PA 0 028 507 where the overall width of a sheet metal plate strip is increased by rolling its two elongated marginal edge sections. The sheet metal strip is returned to its original overall width by subsequently rolling a profiled surface into the elongated edges of the elongated marginal sections by means of profiled disks. After the profiled surfaces along the elongated edges have been fabricated, the sheet metal strip is reformed or reshaped into a C-shaped rail with profile surfaces. In this known method, the laterally outer zone of the sheet metal stip is subject to considerable extension or elongation in the of bending the edges of the sheet metal strip forming the profiled elongated marginal edge sections, whereby distortion of the profiled surfaces occurs. The distortion can be identified by the fact that the tips of the profiled surfaces in the transition region to the outside contour of the marginal sections are rounded off. As a result, the profiled surfaces no longer extend across the entire wall thickness of the marginal sections. A further rounding off of a portion of the profiled surfaces is effected by the disks, which reform or reshape the sheet metal strip into a C-shaped section by applying a high-pressure on the transition region between the marginal sections and the profiled surfaces and thus causing material deformation in the region of the tips of the profiled surfaces. Since the profiled surfaces extend only across a portion of the wall thickness of the marginal sections, only small forces can be carried by the rail nuts for the attached objects extending in the elongated direction of the profiled rails.

SUMMARY OF THE INVENTION

Therefore, the primary object of the present invention is to provide a method where damage to the profiled surfaces extending along the elongated edges of the sheet metal strip is prevented during rolling of the strip into a profiled C-shaped rail.

In accordance with the present invention the elongated marginal edges of the sheet metal strip are folded through 90° by discs and subsequently profiled surfaces are rolled into the elongated edges of the bent marginal sections by means of profiled discs and following that the sheet metal strip is reshaped into a C-shaped rail with profiled surfaces.

When the profiled surfaces are rolled into the longitudinal edges, there is material deformation caused when pressing the elevated regions of the profiled discs into the surface of the elongated edges. A portion of the displaced material migrates outwardly, so that the migrated material projects beyond the original wall thickness of the marginal sections. Accordingly, the elongated edges, after the profiled surfaces have been rolled, are returned to the original wall thickness by means of two calibrated discs. It is particularly advantageous where deep profiled surfaces are formed with higher elevations or deeper recesses, to form the profiled surfaces in several consecutive steps, since more material has to be displaced. Therefore, the profiled surfaces are rolled more than one time after having been calibrated.

To prevent the material projecting beyond the wall thickness of the marginal sections from impairing the rolling of the profiled surfaces, preferably the elongated edges are calibrated after each additional rolling of the profiled surface.

To prevent skidding of installed rail nuts projecting into the interior of the rail with the profiled surfaces extending in the elongated direction, the profiled surfaces on the nuts and the rails is preferably shaped as sets of teeth with the apices of the teeth, that is, the tips, extending at right angles to the elongated direction of the profiled edges.

If several steps are required for rolling the profiled surfaces, the rolling operation is facilitated, if the cross-section of the teeth during the first rolling step is more acute than the cross-section of the teeth in the finished profiled surface.

To assure that the teeth of the profiled surface along the elongated edges run parallel to one another, the rotation of the profiled discs acting along the two elongated edges is preferably synchronized.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIG. 1 is a partial cross-sectional view of the sheet metal strip being bent along one of its elongated edges;

FIG. 2 is a view similar to FIG. 1 with the profiled surfaces being rolled into the elongated edges of the bent marginal section shown in FIG. 1;

FIG. 3 is a view similar to FIGS. 1 and 2 showing the calibration of the marginal sections of the sheet metal strip in the region of the profiled surfaces; and FIG. 4 is a transverse cross-sectional view of the elongated rail in the finished C-shaped section.

DETAILED DESCRIPTION OF THE INVENTION

In FIGS. 1–3 only a part of the sheet metal strip 1 is shown in section mounted in a rolling device containing a number of different discs 5, 6, 7, 8, 9, 10, 11. The sheet metal strip 1 is elongated and is a flat or planar member having a first surface facing upwardly in the drawings and an opposite second surface facing downwardly. Further, the strip has a pair of laterally spaced elongated edges 2 extending between the two surfaces.

In the method steps displayed in FIGS. 1 and 2 though only one marginal section is shown, the plate is acted on along both elongated marginal sections 4, that is, the marginal sections each containing one of the elongated edges 2. The processing of the marginal sections 4 or of the elongated edges 2 is effected consecutively as in the method steps in FIGS. 1–3.

In the first method step, shown in FIG. 1, the two elongated marginal sections 4 of the sheet metal strip 1 are bent upwardly from the upper first surface of the strip through 90° by the rolling discs 5, 6, 7, so that the surfaces of the elongated edges 2 facing upwardly extend parallel to the remaining planar surface of the sheet metal strip 1.

In the second method step a profiled surface is rolled into the elongated edges 2 as illustrated in FIG. 2. The profiled surface is formed by at least one profiling disc 8 for each elongated edge 2 and the profiling disc rolls under pressure along the surface of the elongated edge of the sheet metal strip 1. A counter disc 9 bearing against the lower second or opposite side of the sheet metal strip 1 affords an appropriate support for the profiling disc 8.

While the elongated edges 2 are being rolled by the profiling disc, the material forming the marginal sections is deformed outwardly and, as shown in FIG. 3, the deformed material is compressed by calibrating discs 10, 11 so that the marginal sections 4 containing the elongated edges 2 are returned to their original wall thickness S, note FIG. 3.

FIG. 4 illustrates the finished C-shaped section of the rail 12 after the sheet metal strip 1 has undergone the final calibration. The finished configuration of the rail 12, as shown in FIG. 4, is effected in a known matter. The two marginal sections 4 with the elongated edges 2 containing the profiled surfaces 3 project into the rail.

While specific embodiments of the invention have been shown and described in detail to illustrate the inventive principles, it will be understood that the invention may be embodied otherwise without departing from such principles.

We claim:

1. Method of manufacturing an elongated C-shaped rail from an elongated planar sheet metal strip (1) having a first planar surface an opposite second planar surface and side edges (2) extending between said first and second planar surfaces and in the elongated direction, comprising the steps of bending laterally spaced marginal sections of said sheet metal strip (1) extending along said side edges outwardly from and at substantially 90° relative to said first planar surface, rolling a profiled surface extending in the elongated direction into each of said side edges bent outwardly, after rolling the profiled surfaces into the elongated edges (2), rolling the marginal sections including the elongated edges by calibrating discs (10, 11) to return the marginal sections to an original thickness (S) and subsequently forming said sheet metal strip (1) into a C-shaped section transversely of the elongated direction with the profiled surfaces facing inwardly into the C-shaped rail.

2. Method, as set forth in claim 1, comprising the steps of bending the marginal sections by rolling with discs (5, 6, 7), and rolling the profiled surfaces by profiling discs (8) rolling over and along the side edges (2).

3. Method, as set forth in claim 1, comprising the additional step after the initial rolling of the marginal sections including the elongated edges (2) and returning the marginal sections to the original thickness (5) by rolling the profiled surfaces at least one additional time.

4. Method, as set forth in claim 3, wherein after each additional rolling of the profiled surfaces (3), returning the marginal sections to the original thickness by calibrating the marginal sections (3) including the elongated edges with the profiled surfaces for each additional rolling of the profiled surfaces.

5. Method, as set forth in claims 1 or 2, wherein forming the profiled surfaces (3) as a set of teeth having teeth apices with the apices extending at right angles to the elongated direction of the sheet metal strip (1).

6. Method, as set forth in claims 1 or 2, wherein synchronizing rolling of the profiled surfaces (3) in the elongated edges of said sheet metal strip (1).

* * * * *